United States Patent [19]

Antunez

[11] Patent Number: 5,318,062

[45] Date of Patent: Jun. 7, 1994

[54] READILY SERVICEABLE DIFFERENTIAL PRESSURE ACTUATED BALLCOCK VALVE

[76] Inventor: Bruce A. Antunez, 1143 Indian Springs, Glendora, Calif. 91740

[21] Appl. No.: 17,704

[22] Filed: Jan. 6, 1993

[51] Int. Cl.$^5$ .................... F16K 31/34; F16K 31/385
[52] U.S. Cl. .................... 137/414; 137/218; 137/315; 137/441; 251/46
[58] Field of Search ............ 137/218, 315, 414, 436, 137/437, 441, 443, 444, 451; 251/45, 46

[56] References Cited

U.S. PATENT DOCUMENTS

| | | | |
|---|---|---|---|
| 2,588,242 | 3/1952 | Hunter | 251/46 |
| 2,619,122 | 11/1952 | Hunter | 137/436 |
| 2,635,622 | 4/1953 | Owens | 137/441 |
| 2,734,524 | 2/1956 | Burriss | 137/451 |
| 2,971,525 | 2/1961 | Antunez, Jr. | 137/444 |
| 3,070,118 | 12/1962 | Antunez, Jr. | 137/436 |
| 3,729,017 | 4/1973 | Brandelli | 137/414 |
| 4,122,862 | 10/1978 | Brandelli | 137/441 |
| 4,562,859 | 1/1986 | Shames et al. | 137/414 |
| 4,718,449 | 1/1988 | Ralph | 137/218 |
| 4,922,556 | 5/1990 | Roosa | 137/426 |

Primary Examiner—George L. Walton
Attorney, Agent, or Firm—Donald D. Mon

[57] ABSTRACT

A tank valve for refilling a water tank. A vertical riser has a passage opening through a valve seat in a body. A flow chamber and a discharge chamber are formed around the valve seat. A cap is secured to the body so as to overlay the chambers. The cap has a central socket opening, a plurality of laterally-spaced anit-siphon ports, and a contact surface. The anti-siphon ports open onto the contact surface. A valve control device has a rigid case with a neck and an engaging shoulder. An anti-siphon disc has a hole through which the neck is passed. The neck is inserted in the socket opening and the engaging shoulder presses the disc against the cap. A bias chamber is formed in the case. A retainer is secured to the case. It includes a retaining shoulder which holds a flexible diaphragm to close the bias chamber. The diaphragm has a bias port therethrough. A level controlled valve opens and closes a vent port in the neck. The rigid case, when the neck is inserted in the socket spring, properly locates the diaphragm relative to the valve seat. The case and the anti-siphon disc can be removed and replaced as a unit.

2 Claims, 1 Drawing Sheet

READILY SERVICEABLE DIFFERENTIAL PRESSURE ACTUATED BALLCOCK VALVE

FIELD OF THE INVENTION

This invention relates to water supply valves, often called tank valves, for re-supplying water to water storage tanks, such as tanks used for domestic commodes.

BACKGROUND OF THE INVENTION

Ballcock valves for use in water storage tanks uniformly have the function of opening to supply water to the tank when the water is below a desired storage level, and closing while the water is at or above the desired storage level. Because their operation is related to the water level as it exists in the tank, these valves include a float. The float is somehow connected to the workings of the valve, usually through a pivoted lever.

Such valves are well-known to generations of people who have installed and replaced them, or have had them serviced. Perhaps the most familiar type is shown in Antunez Jr. U.S. Pat. No. 3,070,118, which is a plug-type valve that is opened and closed as the float lowers and rises.

There is another popular type of valve which operates on a differential-pressure principle. This type is exemplified by Roosa U.S. Pat. No. 4,922,556. In such a valve the opening and closing of a vent port reduces or increases the differential pressure across a diaphragm which in turn opens or closes the valve to flow. When the float moves up and down, its position determines whether the vent port is opened or closed.

There are considerable advantages to the pressure-differential type of valve. For example, their actions are usually smoother than the plug-type valves, and the mechanical force needed to operate them is much less than that required for plug-type valves.

Of even greater importance is that the differential-pressure type valve user the system water pressure to keep the valve closed. The plug-type valve must oppose the system pressure by the exertion of a physical lever-type force exerted by the float arm. The use of system pressures for closure requires less linkage, and is potentially more reliable than the plug-type.

A disadvantage of known differential-pressure valves is the difficulty of servicing them. They constitute more than a mere plug to close an orifice. Furthermore, to the householder who has only an occasional (and hopefully very seldom) contact with these valves most of them look different. Given a choice, especially in the after-market-hardware and home supply stores—the purchaser inherently tends to prefer a valve which looks familiar.

As to the problem of servicing. It is at least a sales advantage to provide parts which can foreseeably be required to be replaced in a cartridge form that can quickly and easily be removed and replaced.

The manufacture of ballcock valves is very competitive. These valves sell in the millions each month, both for installation in new housing and offices, and for replacement in existing housing and offices. Increments of cost in fractions of a cent can lose substantial orders. Accordingly, if one wishes to sell differential-pressure type valves in major quantities, they must be cost-competitive with plug-type valves, and with other differential-type valves.

One way to be competitive is to be able to make the total valve out of long-tested, already tooled up basic parts, substituting only a few parts of the workings with different parts and perhaps an insert or two in the basic tool. A further advantage of this approach is that the resulting valve will look like a conventional ballcock.

This invention, by its compatibility with existing plug-type valve structures, enables a purchaser to buy and install a differential-pressure type workings in place of the plug-type workings. Thus at repair time he has the opportunity to change the type of his system.

It is an object of this invention to provide a pressure-differential ballcock valve whose workings can be accommodated in a nearly-standard ballcock body of the plug type, with an appearance closely simulative of already-known types. Preferably the workings will be provided as a plug-in unit.

It is yet another object of this invention to provide an anti-siphon system in which the siphon-breaking device never passes water, and which is disposed at the very top of the valve body, which is readily installed along with the plug in a unit, which does not undergo stretching in operation.

As a consequence of the foregoing, much existing tooling can be used to make a valve with only minor changes to accommodate the valve workings. Important economies are thereby available, and important sales advantages are presented.

BRIEF DESCRIPTION OF THE INVENTION

A ballcock valve according to this invention includes a vertical riser with an internal water supply passage. The riser is adapted to be mounted to the bottom wall of a water storage tank. The water supply passage terminates at an inlet seat in a flow chamber.

The flow chamber connects to a discharge chamber, which in turn discharges water into the tank through a discharge passage. The discharge chamber is partially bounded by an upper cap which is detachably attached to the riser. A siphon breaker port is formed through this cap.

According to a feature of this invention, the cap has a socket in which valve workings that are to control flow past the inlet seat are fitted so as accurately to be located relative to the inlet seat when the cap is fixed to the riser.

According to a preferred but optional feature of the invention, the workings include an anti-siphon flapper which bears against the cap and closes the anti-siphon port except when a negative (suction) pressure exists in the discharge chamber. This flapper is held in place by the workings, and does not require stretching for its operation.

The above and other features and advantages of this invention will be fully understood from the following detailed description and accompanying drawings, in which:

DETAILED DESCRIPTION OF THE INVENTION

Figure 1:
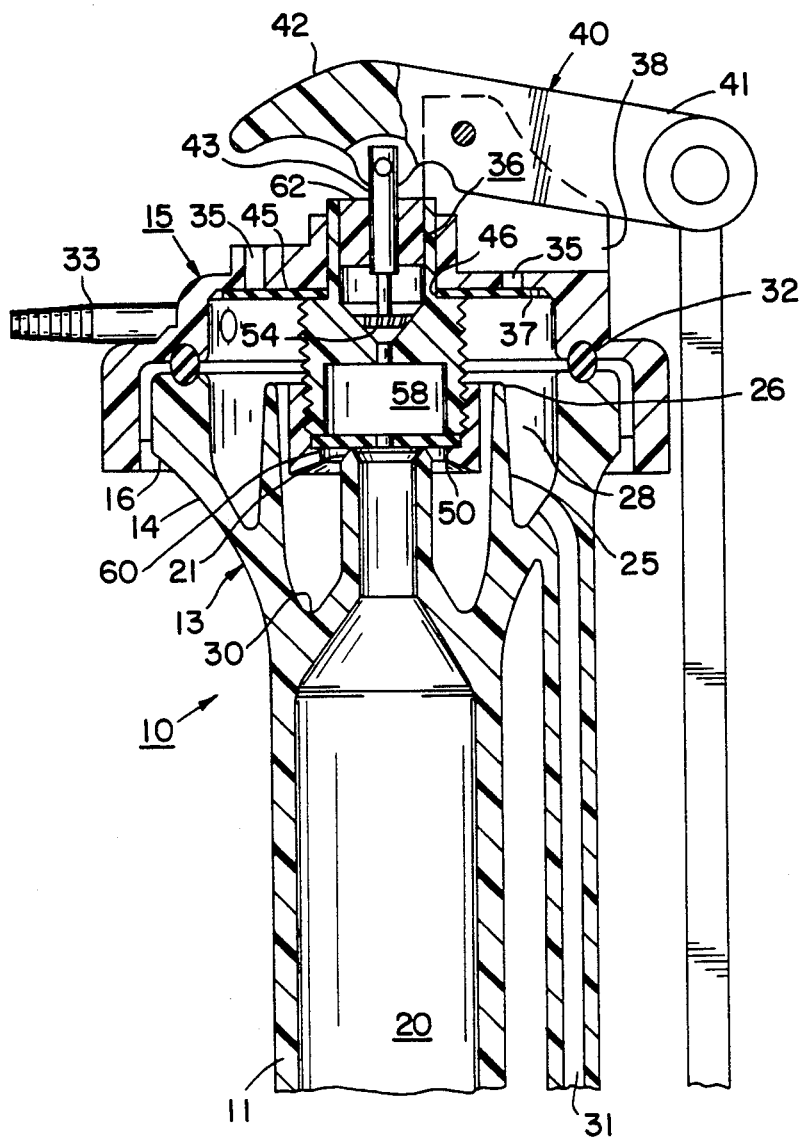
FIG. 1 is an axial cross-section of the presently-preferred embodiment of the invention.
Figure 2:
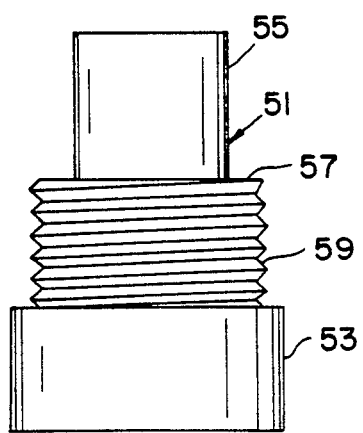
FIG. 2 is a side view of a portion of the device.
Figure 3:
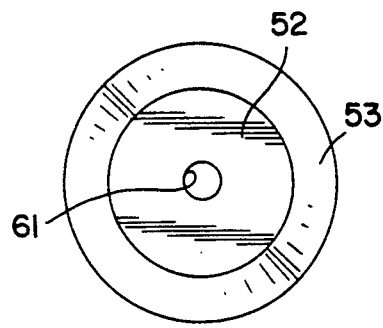
FIG. 3 is a bottom view of FIG. 2.

A ballcock valve 10 according to this invention has a vertical riser 11 adapted to be mounted to the bottom wall of a water tank. The riser forms the lower part of a valve body 13 with a lower base 14 and a cap 15.

The base and cap are removably joined together by conventional means such as a bayonet coupling 16. Any other suitable means could instead be utilized such as screw-type fasteners, for example.

The riser includes an internal flow passage 20 which receives water under pressure from a supply, and terminates at an inlet seat 21 which lies in a horizontal plane.

A circular, peripheral spacer 25 rises from the base, spaced from and rising above the inlet seat. It has an upper edge 26. A flow chamber 27 is bounded by spacer 25, the inlet seat being inside it, when the valve is open. A discharge chamber 28 surrounds the spacer.

When the valve is open to flow, water exits the inlet passage, flows through the flow chamber, over edge 26, into the discharge chamber.

A discharge groove 30 surrounds the spacer. A discharge tube 31, which may be molded with the rest of the base, connects to this groove and discharges water into the tank from the discharge chamber.

Base 14 and cap 15 trap a sealing ring 32 between them to close the discharge chamber. A bowl fill fitting 33 extends from the top of the discharge chamber to supply water to refill the bowl.

A plurality of anti-siphon ports 35 pass through the top of the cap. A tubular socket 36 (sometimes called a socket opening) extends through the top of the cap and rises above it. An interior contact surface 37 surrounds the socket, and overlaps the anti-siphon ports.

A bracket 38 on top of the cap hingedly supports a lever 40. Lever 40 includes a float arm 41 to be connected to a suitable float, and an actuator arm 47. Actuator arm mounts and moves a valve actuator 43, which is preferably a rigid pin.

An anti-siphon disc 45 is a flat sheet of flexible water-resistant material. It has a central mounting hole 46 and is adapted to lay flat against contact surface 37 except when there is a negative pressure in the discharge chamber.

A feature of this invention resides in valve workings (sometimes called a socket opening) 50. Workings 50 include a rigid case 51, a flexible control diaphragm 52, a retainer 53, and valve means 54.

Case 51 includes a neck 55 which closely fits in socket 36, a locating shoulder 57 (sometimes called an "engaging shoulder"), and a bias chamber 58.

Retainer 53 is held to the bottom end of the case by means such as threads 59. The retainer includes a retention shoulder 60 (sometimes called a "retaining shoulder") which partially overhangs the bias chamber at the bottom. Also, it traps the peripheral edge of diaphragm 52. Diaphragm 52 has a bias port 61 through it, preferably at its center.

A vent port 62 is formed from the bias port to the outside of the valve by a clearance between the actuating pin and the inside wall of the socket.

Valve means 54 may be any type of valve which opens or closes the bias port as a function of the height of the actuating pin in it. Various means are known for this purpose, such as plugs, grooved sleeves or the like, and their identify is not important to this invention. For this reason, this valve is shown semi-schematically.

The dimensions of the insert are selected such that, when the neck is fully inserted into the socket, the center of the anti-siphon disc is held against the cap, and the bottom face of the diaphragm bears against the inlet seat to close it. When the pressure is equal on both sides of the diaphragm, the valve will be closed, because the unrestrained area of the diaphragm inside the bias chamber is larger than the diaphragm area bounded by the inlet seat when the valve is closed to flow. Notice that the insert is supported by the cap, and does not require further reference to any other part of the valve. All dimensional requirements are met by the fit of the neck in the socket.

When the bias chamber is vented, there is a differential pressure relative to supply pressure which will displace the diaphragm and open the valve. When valve 54 is closed, pressure rises in the bias chamber and forces the diaphragm to close the valve. Such action is well-known.

The visual and structural similarity of this valve to conventional valves is evident. This is a major advantage in reducing manufacturing costs. Further, the insert can be removed and replaced merely by taking the cap off, removing the old workings, pushing a new one into the socket, and closing the cap.

Another advantage resides in the anti-siphon disc. When a negative pressure is exerted in the discharge chamber, it flexes at its edges to uncover the anti-siphon ports and breaks the suction. It is not necessary for it to stretch to permit water to flow past it, because water does not flow past it, as in many known valves. In such other valves, fatigue of the material and loss of elasticity is a concern. With the illustrated disc, only occasional flexure is needed, and this only in the infrequent event of a suction to be broken.

Notice also that the anti-siphon ports are at the very top of the valve, and not in the path of water flow.

This invention is not to be limited by the embodiments shown in the drawings and described in the description, which are given by way of example and not of limitation, but only in accordance with the scope of the appended claims.

I claim:

1. In a tank valve of the type used to refill a tank with water to a predetermined level, said valve having a vertical riser extending along a vertical axis, a valve seat atop the riser, a water supply passage extending axially through the riser and opening into the valve seat through an inlet port, a base, a separate cap removably attachable to said base, a spacer surrounding and spaced from said inlet port, a flow chamber formed within said spacer, a discharge chamber formed outside of said spacer, and a discharge tube discharging from said discharge chamber, said cap overlaying said chambers, the improving comprising:

a socket opening in said cap concentric with said vertical axis, an interior contact surface within said cap surrounding said socket opening, a plurality of anti-siphon ports through said cap and opening into said discharge chamber through said interior contact surface, an anti-siphon disc having a face adapted normally to lay against said contact surface and close said anti-siphon ports, but to be flexed away from it when a negative pressure relative to atmosphere exists in said discharge chamber to open said anti-siphon ports, said disc having a central aperture therethrough aligned with said socket opening;

a valve control device comprising a rigid case, said case having a neck and an engaging shoulder, said neck being passed through said aperture in said disc, whereby with the neck pressed into the socket, the disc is pressed against the cap and retained between the engaging shoulder and the interior contact surface, a bias chamber inside the case, said case being open at its end opposite the neck, a flexible diaphragm, a retainer disposed at the lower portion of the case, a retaining shoulder on said retainer overhanging a peripheral portion of said diaphragm so as to hold the diaphragm against the lower portion if the case, thereby to close the bias chamber at its lower end, whereby when the neck is inserted in the socket opening with the neck passing through the aperture in the disc with the engaging shoulder pressing the disc against the cap, the case positions the diaphragm correctly relative to the inlet seat, a bias port through said diaphragm, a vent port through said neck, and a valve means for opening and closing said vent port; and level-responsive valve actuator means connected to said valve means whereby with the cap removed from the base, the case can be removed as a unitary body along with the disc and the diaphragm.

2. Valving means for fitting to a vertical riser extending along a vertical axis, the riser having an upwardly-facing valve seat, a base, a water supply passage extending axially through the riser and opening into the valve seat through an inlet port, a spacer surrounding and spaced from the inlet port, a discharge region formed outside of said spacer and a discharge tube discharging from said region, said valving means comprising:

a separate cap removably attachable to said base overlaying said discharge region;

a socket opening in said cap concentric with said vertical axis, an interior contact surface within said cap surrounding said socket opening, a plurality of anti-siphon ports through said cap and opening into said discharge chamber through said interior contact surface, an anti-siphon disc having a face adapted normally to lay against said contact surface and close said anti-siphon ports, but to be flexed away from it when a negative pressure relative to atmosphere exists in said discharge chamber to open said anti-siphon ports, said disc having a central aperture therethrough aligned with said socket opening;

a valve control device comprising a rigid case, said case having a neck and an engaging shoulder, said neck being passed through said aperture in said disc whereby with the neck pressed into the socket, the disc is pressed against the cap and is retained between the engaging shoulder and the interior contact surface, a bias chamber inside the case, said case being open at its end opposite the neck, a flexible diaphragm, a retainer disposed at the lower portion of the case, a retaining shoulder on said retainer overhanging a peripheral portion of said diaphragm so as to hold the diaphragm against the lower portion if the case, thereby to close the bias chamber at its lower end, whereby when the neck is inserted in the socket opening with the neck passing through the aperture in the disc with the engaging should pressing the disc against the cap, the case positions the diaphragm correctly relative to the inlet seat, a bias port through said diaphragm, a vent port through said neck, and valve means for opening and closing said vent port; and level-responsive valve actuator means connected to said valve means, whereby with the cap removed from the base, the case can be removed as a unitary body along with the disc and the diaphragm.

* * * * *